(12) United States Patent
Nugent et al.

(10) Patent No.: US 9,679,241 B2
(45) Date of Patent: Jun. 13, 2017

(54) THERMODYNAMIC RANDOM ACCESS MEMORY FOR NEUROMORPHIC COMPUTING UTILIZING AHAH (ANTI-HEBBIAN AND HEBBIAN) AND MEMRISTOR COMPONENTS

(71) Applicant: KnowmTech, LLC, Albuquerque, NM (US)

(72) Inventors: Alex Nugent, Santa Fe, NM (US); Timothy Molter, Oberstdorf (DE)

(73) Assignee: KnowmTech, LLC, Santa Fe, NM (US)

( * ) Notice: Subject to any disclaimer, the term of this patent is extended or adjusted under 35 U.S.C. 154(b) by 399 days.

(21) Appl. No.: 14/460,668

(22) Filed: Aug. 15, 2014

(65) Prior Publication Data
US 2015/0074029 A1    Mar. 12, 2015

Related U.S. Application Data

(60) Provisional application No. 61/875,150, filed on Sep. 9, 2013.

(51) Int. Cl.
*G06F 17/00* (2006.01)
*G06N 5/00* (2006.01)
*G06N 3/063* (2006.01)

(52) U.S. Cl.
CPC .................... *G06N 3/063* (2013.01)

(58) Field of Classification Search
CPC ...... G06N 3/063; G06N 3/0418; G06N 3/049; G06N 5/00; G11C 11/54; G11C 13/00
See application file for complete search history.

(56) References Cited

U.S. PATENT DOCUMENTS

| 6,889,216 | B2 | 5/2005 | Nugent |
| 6,995,649 | B2 | 2/2006 | Nugent |
| 7,028,017 | B2 | 4/2006 | Nugent |
| 7,039,619 | B2 | 5/2006 | Nugent |
| 7,107,252 | B2 | 9/2006 | Nugent |
| 7,392,230 | B2 | 6/2008 | Nugent |
| 7,398,259 | B2 | 7/2008 | Nugent |
| 7,409,375 | B2 | 8/2008 | Nugent |
| 7,412,428 | B2 | 8/2008 | Nugent |
| 7,420,396 | B2 | 9/2008 | Nugent |

(Continued)

OTHER PUBLICATIONS

'AHaH Computing—From Metastable Switches to Attractors to Machine Learning': Nugent, Feb. 2014, Plos One, vol. 9, Issue 2.*

(Continued)

*Primary Examiner* — Stanley K Hill
*Assistant Examiner* — Peter Coughlan
(74) *Attorney, Agent, or Firm* — Kermit D. Lopez; Luis M. Ortiz; Ortiz & Lopez, PLLC

(57) ABSTRACT

A thermodynamic random access memory includes one or more AHaH (Anti-Hebbian and Hebbian) node wherein read out of data is accomplished via a common summing electrode through memristive components and wherein multiple input cells are simultaneously active. A ktRAM architecture comprising a memory wherein each input synapse or "bit" of the memory interacts on or with a common electrode through a common "dendritic" electrode, and wherein each input can be individually driven. Each input constitutes a memory cell driving a common electrode.

20 Claims, 4 Drawing Sheets

(56) References Cited

U.S. PATENT DOCUMENTS

| | | |
|---|---|---|
| 7,426,501 B2 | 9/2008 | Nugent |
| 7,502,769 B2 | 3/2009 | Nugent |
| 7,599,895 B2 | 10/2009 | Nugent |
| 7,752,151 B2 | 7/2010 | Nugent |
| 7,827,130 B2 | 11/2010 | Nugent |
| 7,827,131 B2 | 11/2010 | Nugent |
| 7,930,257 B2 | 4/2011 | Nugent |
| 8,022,732 B2 | 9/2011 | Nugent |
| 8,041,653 B2 | 10/2011 | Nugent |
| 8,156,057 B2 | 4/2012 | Nugent |
| 8,311,958 B2 | 11/2012 | Nugent |
| 8,332,339 B2 | 12/2012 | Nugent |
| 8,781,983 B2 | 7/2014 | Nugent |
| 2003/0177450 A1 | 9/2003 | Nugent |
| 2003/0236760 A1 | 12/2003 | Nugent |
| 2004/0039717 A1 | 2/2004 | Nugent |
| 2004/0153426 A1 | 8/2004 | Nugent |
| 2004/0162796 A1 | 8/2004 | Nugent |
| 2004/0193558 A1 | 9/2004 | Nugent |
| 2005/0015351 A1 | 1/2005 | Nugent |
| 2005/0149464 A1 | 7/2005 | Nugent |
| 2005/0149465 A1 | 7/2005 | Nugent |
| 2005/0151615 A1 | 7/2005 | Nugent |
| 2005/0256816 A1 | 11/2005 | Nugent |
| 2006/0036559 A1 | 2/2006 | Nugent |
| 2006/0184466 A1 | 8/2006 | Nugent |
| 2007/0005532 A1 | 1/2007 | Nugent |
| 2007/0022064 A1 | 1/2007 | Nugent |
| 2007/0176643 A1 | 8/2007 | Nugent |
| 2008/0258773 A1 | 10/2008 | Nugent |
| 2009/0043722 A1 | 2/2009 | Nugent |
| 2009/0138419 A1 | 5/2009 | Nugent |
| 2009/0228415 A1 | 9/2009 | Nugent |
| 2009/0228416 A1 | 9/2009 | Nugent |
| 2010/0280982 A1 | 11/2010 | Nugent |
| 2010/0287124 A1 | 11/2010 | Nugent |
| 2011/0145177 A1 | 6/2011 | Nugent |
| 2011/0145179 A1 | 6/2011 | Nugent |
| 2011/0161268 A1 | 6/2011 | Nugent |
| 2011/0302119 A1 | 12/2011 | Nugent |
| 2012/0078827 A1 | 3/2012 | Nugent |
| 2012/0150780 A1 | 6/2012 | Nugent |
| 2012/0175583 A1 | 7/2012 | Nugent |
| 2012/0191438 A1 | 7/2012 | Nugent |
| 2013/0218815 A1 | 8/2013 | Nugent |
| 2013/0258905 A1 | 10/2013 | Nugent |
| 2013/0275358 A1 | 10/2013 | Nugent |
| 2013/0289902 A1 | 10/2013 | Nugent |
| 2014/0006323 A1 | 1/2014 | Nugent |
| 2014/0156576 A1 | 6/2014 | Nugent |
| 2014/0192587 A1 | 7/2014 | Nugent |

OTHER PUBLICATIONS

'Cortical Processing with Thermodynamic-RAM': Nugent, 2014, arxiv:1408.3215v1.*

'Memristor Crossbar Memory for Hybrid Ultra Low Power Hearing Aid Speech Processor: Shah, 2013, IEEE, 978-1-4799-0676.*

* cited by examiner

THERMODYNAMIC RANDOM ACCESS MEMORY FOR NEUROMORPHIC COMPUTING UTILIZING AHAH (ANTI-HEBBIAN AND HEBBIAN) AND MEMRISTOR COMPONENTS

CROSS-REFERENCE TO PROVISIONAL APPLICATION

This application claims priority under 35 U.S.C. 119(e) to U.S. Provisional Patent Application Ser. No. 61/875,150, entitled "ktRAM Design," which was filed on Sep. 9, 2013, the disclosure of which is incorporated herein by reference in its entirety.

GOVERNMENT RIGHTS STATEMENT

The United States Government has certain rights in this invention pursuant to Contract No. FA8750-13-C-0031 awarded by the United States Air Force.

FIELD OF THE INVENTION

Embodiments are generally related to machine learning applications. Embodiments also relate to memory, memristor devices, and applications thereof. Embodiments further relate to AHaH (Anti-Hebbian and Hebbian) learning devices, designs, and configurations. Embodiments also to relate to AHaH controllers and devices.

BACKGROUND

A number of technological and economic pressures currently exist in the development of new types of electronics. Recent advancements in quantum computing, MEMS, nanotechnology, and molecular and memristive electronics offer new and exciting avenues for extending the limitations of conventional von Neumann digital computers. As device densities increase, the cost of R&D and manufacturing has skyrocketed due to the difficulty of precisely controlling fabrication at such a small scale. New computing architectures are needed to ease the economic pressures described by what has become known as Moore's second law: The capital costs of semiconductor fabrication increases exponentially over time. We expend enormous amounts of energy constructing the most sterile and controlled environments on earth to fabricate modern electronics. Life however is capable of assembling and repairing structures of far greater complexity than any modern chip, and it is capable of doing so while embedded in the real world, and not a clean room.

IBM's cat-scale cortical simulation of 1 billion neurons and 10 trillion synapses, for example, required 147,456 CPUs, 144 TB of memory, and ran at $\frac{1}{83}$rd real time. At a power consumption of 20 W per CPU, this is 2.9 MW. If we presume perfect scaling, a real-time simulation would consume 83× more power or 244 MW. At roughly thirty times the size of a cat cortex, a human-scale cortical simulation would reach over 7 GW. The cortex represents a fraction of the total neurons in a brain, neurons represent a fraction of the total cells, and the IBM neuron model was extremely simplified. The number of adaptive variables under constant modification in the IBM simulation is orders of magnitude less than the biological counterpart and yet its power dissipation is orders of magnitude larger. The power discrepancy is so large it calls attention not just to a limit of our current technology, but also to a deficiency in how we think about computing.

Brains have evolved to move bodies through a complex and changing world. In other words, brains are both adaptive and mobile devices. If we wish to build practical artificial brains with power and space budgets approaching biology, we must merge memory and processing into a new type of physically adaptive hardware.

SUMMARY

The following summary of the invention is provided to facilitate an understanding of some of the innovative features unique to the disclosed embodiments and is not intended to be a full description. A full appreciation of the various aspects of the invention can be gained by taking the entire specification, claims, drawings, and abstract as a whole.

It is, therefore, one aspect of the disclosed embodiments to provide for an improved memory architecture and devices and components thereof.

It is another aspect of the disclosed embodiments to provide a ktRAM ("Known Thermodynamic Random Access Memory" or "Thermodynamic Random Access Memory") architecture and devices and components thereof.

It is a further aspect of the disclosed embodiments to provide for a ktRAM SRAM Cell of varying scope and type.

It is yet another aspect of the disclosed embodiments to provide for a thermodynamic random access memory for neuromorphic computing utilizing AHaH (Anti-Hebbian and Hebbian) and memristor components.

The aforementioned aspects and other objectives and advantages can now be achieved as described herein. In an example embodiment, an apparatus can be implemented which includes a ktRAM comprising at least one AHaH (Anti-Hebbian and Hebbian) node wherein read out of data is accomplished via a common summing electrode through memristive components and wherein multiple input cells are simultaneously active.

A ktRAM architecture is disclosed comprising a memory wherein each input synapse or "bit" of the memory interacts on or with a common electrode through a common "dendritic" electrode, and wherein each input can be individually driven. Each input constitutes a memory cell driving a common electrode. One or more AHaH nodes can be provided wherein read out of data is accomplished via a common summing electrode through memristive components and wherein multiple input cells are simultaneously active.

BRIEF DESCRIPTION OF THE FIGURES

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION

Figure 1:
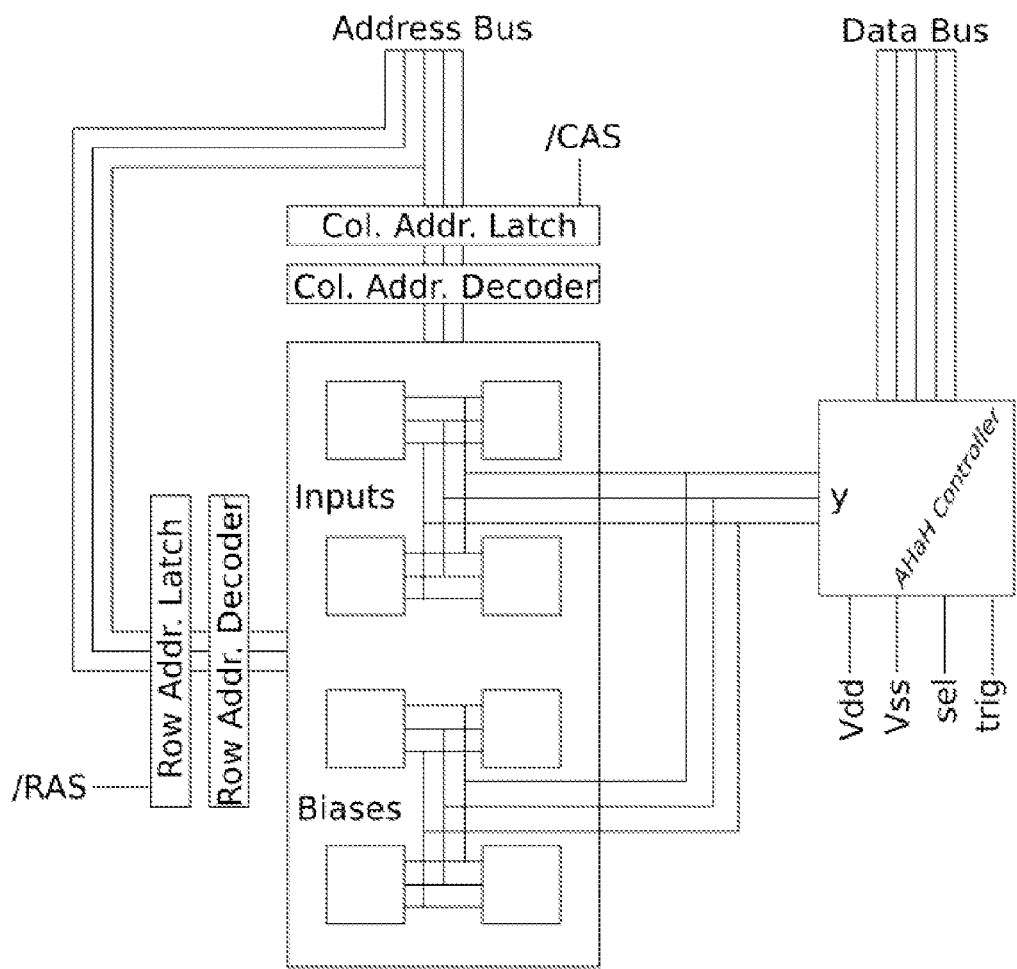
FIG. 1 illustrates a schematic diagram of a ktRAM architecture in accordance with a preferred embodiment.

The particular values and configurations discussed in these non-limiting examples can be varied and are cited merely to illustrate an embodiment of the present invention and are not intended to limit the scope of the invention.

The disclosed embodiments described herein generally cover a three-fold purpose. First, such embodiments reveal the common hidden assumption of non-volatility in computer engineering and how this mindset is fundamentally at odds with biology and physics and likely responsible for the extreme power discrepancy between modern computing technologies and biological nervous systems. Second, a simple adaptive circuit and functional model is discussed herein, which can be configured from collections of metastable (e.g., volatile) switches and used as a foundational building block to construct higher order machine learning capabilities. Third, we demonstrate how a number of core machine learning functions such as clustering, classification, and robotic actuation can be derived from our adaptive building block. When taken all together, we hope to show that a relatively clear path exists between the technology of today and the adaptive physically self-organizing neuromorphic processors of tomorrow.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Note that the term "module" as utilized herein may refer to a physical module or component such as electrical component/hardware and/or the term "module" may refer to computer software (e.g., a software module, program module, etc.), computer programs, subroutines, routines, etc. Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked personal computers, minicomputers, mainframe computers, servers, and the like. Thus, a module may be, for example, a software module or a routine or subroutines. In other cases, a module may be a physical component such as an IC chip, IC chip components, etc.

It can be appreciated the disclosed architecture may be implemented in the context of hardware (e.g., as an IC chip) and/or as computer software, module, etc., for carrying out instructions/algorithms, etc. Thus, the disclosed framework can be implemented as a hardware IC chip, software modules, etc., or a combination thereof.

Note that as utilized herein, the term "AHA" or "AHaH" generally refers to "Anti-Hebbian and Hebbian". Hence, "AHaH plasticity" refers to "Anti-Hebbian and Hebbian plasticity" and an "AHaH Node" refers to a neuron model that implements AHaH plasticity. One non-limiting example of an application of an AHaH plasticity rule is disclosed in U.S. Pat. No. 7,398,259, which is incorporated herein by reference. Another non-limiting example of an AHaH plasticity rule is disclosed in U.S. Pat. No. 7,409,375, which is also incorporated herein by reference. A further non-limiting example of an AHaH plasticity rule is disclosed in U.S. Pat. No. 7,412,428, which is incorporated herein by reference.

An additional non-limiting example of an AHaH plasticity rule is disclosed in U.S. Pat. No. 7,420,396, which is incorporated herein by reference. Another non-limiting example of an AHaH plasticity rule is disclosed in U.S. Pat. No. 7,502,769 entitled, which is incorporated herein by reference. A further non-limiting example of an AHaH plasticity rule is disclosed in U.S. Pat. No. 7,599,895, which is incorporated herein by reference. Another non-limiting example of an AHaH plasticity rule is disclosed in U.S. Pat. No. 7,827,130, which is incorporated herein by reference An additional non-limiting example of an AHaH plasticity rule is disclosed in U.S. Pat. No. 7,930,257, which is incorporated herein by reference. A further non-limiting example of an AHaH plasticity rule is disclosed in U.S. Pat. No. 8,022,732, which is incorporated herein by reference. Another non-limiting example of an AHaH plasticity rule is disclosed in U.S. Pat. No. 8,041,653, which is also incorporated herein by reference. Another non-limiting example of AHaH devices and applications is disclosed in U.S. patent application Ser. No. 13/908,410 entitled "Memristive Neural Processor Utilizing Anti-Hebbian and Hebbian Technology," which is incorporated herein by reference in its entirety.

The disclosed embodiments generally describe a design of ktRAM. There are several options for building ktRAM including SDRAM, DRAM, 2-1 AHaH Nodes, 2-2 AHaH Nodes, Ag-Chalcogenide memristors, Ag—Si memristors, various wire widths, etc. Here we can select just one single option for each design choice in order to arrive at a final design and characterization of a ktRAM module. Later, we can look at other options to compare different design choices. For this first final design, we have set the following design parameters: Static RAM (1 square micron per cell); and 2-1 two-phase AHaH Nodes. Note that the term ktRAM as utilized herein including both the claims and specification refers to "Known Thermodynamic Random Access Memory" or simply "Thermodynamic Random Access Memory".

The disclosed approach to configuring/building a ktRAM module involves the inclusion of AHaH Nodes on top of a RAM chip and add the necessary supporting circuitry and control lines to the chip. The ktRAM chips would then be integrated into modules similar to RAM modules found in today's commodity computers. This approach has the following advantages. For example, we can utilize a vast knowledge-base of existing tried-and-true RAM architecture. The form-factor of the final ktRAM product is dearly designed and imaginable. The ktRAM chip and modules can be integrated into existing commodity motherboards alongside RAM and CPUs. Many companies and an entire industry already exist that produce RAM from which our ktRAM manufacturing can be bootstrapped. Marketing of ktRAM modules is made easier as people are already familiar and comfortable with RAM modules.

FIG. 1 illustrates a schematic diagram of a ktRAM architecture in accordance with a preferred embodiment. We may think of ktRAM as one large memory were each input synapse or "bit" of the memory is interacting on a common electrode through a common "dendritic" electrode y. We must be able to individually drive each input. These two requirements point to an interesting direction where each input is a memory cell driving a common electrode.

The requirement of insuring each memristor gets exactly the same drive duration leads to dendritic tree designs that eliminate clock skew. The main idea is that an AHaH node is like a standard memory architecture with the exception that "read out" is done through a common summing electrode through memristive components and multiple input cells are active at the same time. The memory cells may be implemented with either DRAM or SRAM architecture, but for sake of simplicity and focus for this first design, we will stick to static RAM. An example of ktRAM architecture is shown in FIG. 1.

ktRAM Operation ktRAM operation can be as follows:
1. reset all cells to "off".
For each input do:
1. The row address is placed on the address pins via the address bus.
2. The /RAS pin is activated, which places the row address onto the Row Address Latch.
3. The Row Address Decoder selects the proper row.
4. The column address is placed on the address pins via the address bus.
5. The /CAS pin is activated, which places the column address on the Column Address Latch.
6. The Column Address Decoder selects the proper column.
7. /RAS and /CAS are both deactivated so that the cycle can begin again.
Now get the output:
1. The 'sel' line is set to the 'read' polarity.
2. The 'trig' line is activated for the desired read time.
3. The output is placed on the data bus.
4. The 'sel' line is set to the 'write' polarity.
5. The 'trig' line is activated for the desired write time.
Repeat:
Once the data appears on the data bus, the driver knows it can load the next set of active inputs The AHaH Controller's job is to 'activate' the synapses. Each synapse selected by the RAM selector process needs to receive Anti-Hebbian (read) and Hebbian (write) updates. There are two main ways to achieve this requiring very different designs and considerations, and each way has distinct advantages and disadvantages.

AHaH Controller Type I

Figure 2:
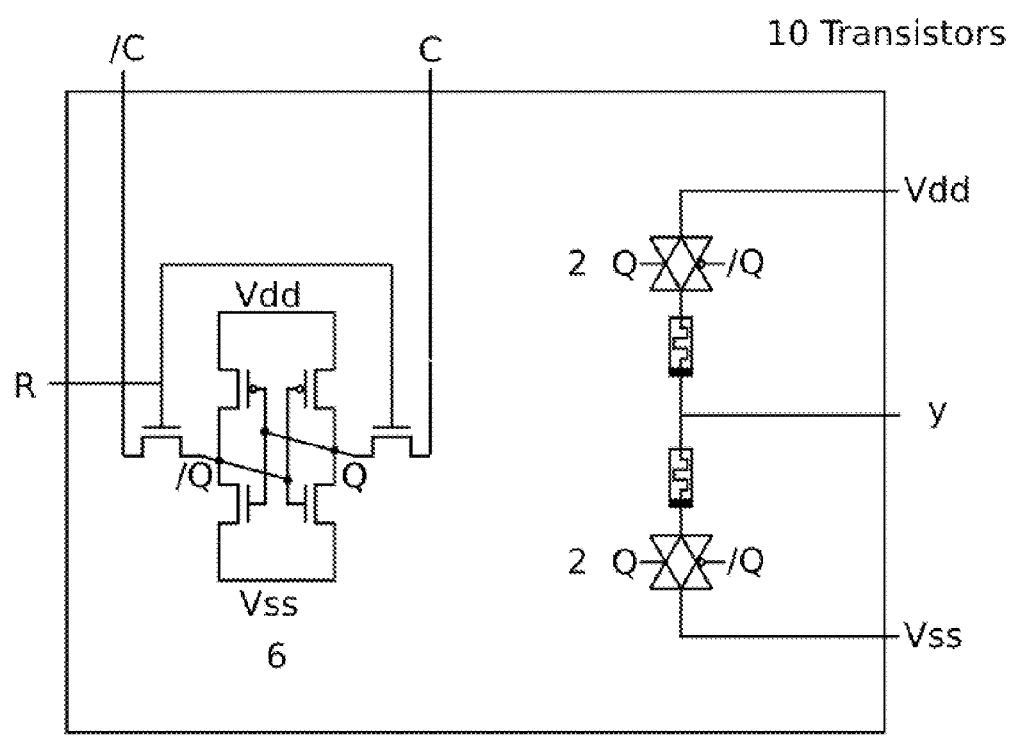
FIG. 2 illustrates a schematic diagram of a ktRAM SRAM Cell Type I in accordance with an embodiment.

In the type I AHaH Controller, Vdd and Vss are supplied through the H-Tree directly via the AHaH Controller. FIG. 2 illustrates a schematic diagram of an example ktPower consumption is dominated by static resistive impedance of two h_tree and two memristors. Following are some example numbers assuming a resistance of 250 Ohm per memristor and Vdd–Vss=1V.

Figure 3:
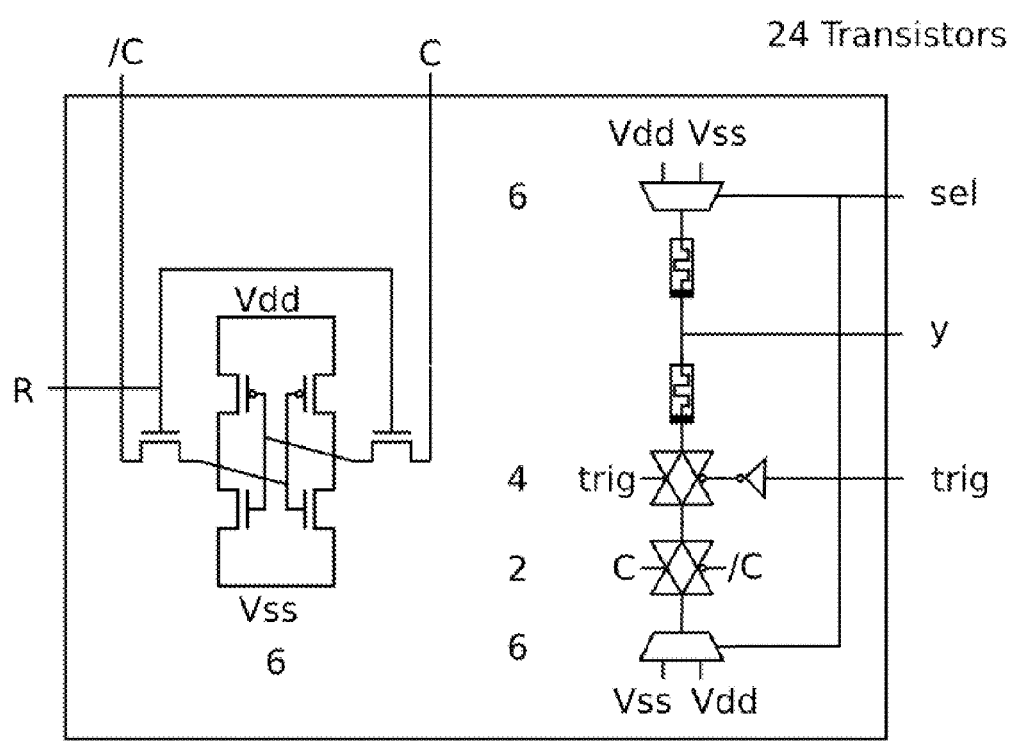
FIG. 3 illustrates a schematic diagram of a ktRAM SRAM Cell Type II in accordance with an alternative embodiment.

Assumptions/Givens
One AHaH cycle per second 250 Ohm memristor
Vdd–Vss=1V 1 us activation times (2 us total)
activate one cell
R_tot=2H-Tree Resistance+2(250)
v×t=10^-6=1V×1 us AHaH Controller Type II In the type II AHaH Controller, Vdd and Vss are supplied through local Vdd and Vss rails. FIG. 3 illustrates a schematic diagram of an example ktRAM SRAM Cell Type II in accordance with an alternative embodiment.

Power consumption is dominated by static capacitive impedance of two H-Trees for the select and trigger operations. Not only must the capacitance of the H-tree itself be considered, but the gate capacitances of the Muxes, inverter, and pass gate as well (11 gates per cell). Following are some example numbers assuming a resistance of 250 Ohm per memristor and Vdd–Vss=1V and 10 fF gate capacitance per cell. The 4-factor is due to 4 switches occurring per AHaH cycle: sel, trig, sel, trig. Assuming f=1 Hz.

Figure 4:
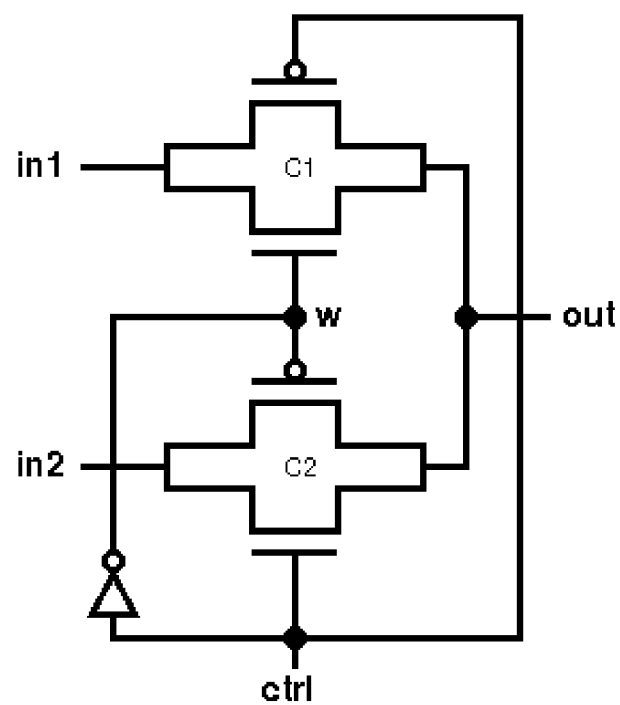
FIG. 4 illustrates a schematic diagram of a 2 to 1 MUX circuit, in accordance with an alternative embodiment.

Assumptions/Givens
One AHaH cycle per second
250 Ohm memristor
Vdd–Vss=1V
10 tF gate capacitance per cell
11 gates per cell
1 us activation times (2 us total)
activate one cell
v×t=10^-6=1V×1 us FIG. 4 illustrates a schematic diagram of a 2 to 1 MUX circuit, in accordance with an alternative embodiment.

Note that throughout the following discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer readable tangible, non-transitory medium. For example, a server can include one or more computers operating as a web server, database server, or other type of computer server in a manner to fulfill described roles, responsibilities, or functions. Within the context of this document, the disclosed assemblies or devices are also deemed to comprise computing devices having a processor and a non-transitory memory storing instructions executable by the processor that cause the device to control, manage, or otherwise manipulate the features of the assemblies.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. An apparatus, comprising:
a ktRAM comprising at least one AHaH (Anti-Hebbian and Hebbian) node wherein read out of data is accomplished via a common summing electrode through memristive components and wherein multiple input cells are simultaneously active.

2. The apparatus of claim 1 further comprising an AHaH controller.

3. The apparatus of claim 2 wherein said AHaH controller communicates with and controls said at least one AHaH node.

4. The apparatus of claim 3 wherein a voltage $V_{dd}$ and a voltage $V_{ss}$ are supplied through an H-Tree configuration via said AHaH controller.

5. The apparatus of claim 3 wherein a voltage $V_{dd}$ and a voltage $V_{ss}$ are supplied through respective local $V_{dd}$ and $V_{ss}$ rails.

6. The apparatus of claim 2 further comprising at least one synapse comprising said at least one AHaH node.

7. The apparatus of claim 6 wherein AHaH controller activates said at least one synapse.

8. The apparatus of claim 2 wherein said at least one AHaH node and said AHaH controller function according to an AHaH plasticity rule.

9. The apparatus of claim 1 wherein said ktRAM comprises an integrated circuit chip.

10. The apparatus of claim 1 wherein ktRAM comprises said at least one AHaH node among a plurality of AHaH nodes is configured on top of a RAM (Random Access Memory) circuit.

11. The apparatus of claim 1 wherein said at least one AHaH node comprises a 2-1 AHaH node.

12. The apparatus of claim 1 wherein said at least one AHaH node comprises a 2-2 AHaH node.

13. The apparatus of claim 1 wherein said memristive components comprises at least one Ag-Chalcogenide memristor.

14. The apparatus of claim 1 wherein said memristive components comprises at least one Ag—Si memristor.

15. The apparatus of claim 1 wherein said at least one AHaH node functions according to an AHaH plasticity rule.

16. The apparatus of claim 1 wherein said ktRAM comprises thermodynamic random access memory.

17. The apparatus of claim 1 wherein said memristive components comprise at least one memristor.

18. An apparatus, comprising:
   a ktRAM comprising at least one AHaH (Anti-Hebbian and Hebbian) node wherein read out of data is accomplished via a common summing electrode through memristive components and wherein multiple input cells are simultaneously active; and
   an AHAH controller that communicates with and controls said at least one AHaH node.

19. The apparatus of claim 18 wherein said ktRAM comprises thermodynamic random access memory and wherein said memristive components comprise at least one memristor.

20. An apparatus, comprising:
   a ktRAM comprising at least one AHaH (Anti-Hebbian and Hebbian) node wherein read out of data is accomplished via a common summing electrode through memristive components and wherein multiple input cells are simultaneously active, and wherein said ktRAM comprises an integrated circuit chip.

* * * * *